US009732234B2

(12) United States Patent
Denney, III

(10) Patent No.: US 9,732,234 B2
(45) Date of Patent: Aug. 15, 2017

(54) ACOUSTIC PAINT

(71) Applicant: Theodore W. Denney, III, San Clemente, CA (US)

(72) Inventor: Theodore W. Denney, III, San Clemente, CA (US)

( * ) Notice: Subject to any disclaimer, the term of this patent is extended or adjusted under 35 U.S.C. 154(b) by 0 days.

(21) Appl. No.: 14/936,465

(22) Filed: Nov. 9, 2015

(65) Prior Publication Data

US 2017/0130059 A1   May 11, 2017

(51) Int. Cl.

| | |
|---|---|
| *C09D 11/52* | (2014.01) |
| *C09D 1/00* | (2006.01) |
| *C09D 5/03* | (2006.01) |
| *G10K 11/20* | (2006.01) |
| *E04B 1/99* | (2006.01) |
| *E04B 1/82* | (2006.01) |
| *E04F 13/072* | (2006.01) |

(52) U.S. Cl.
CPC ............. *C09D 5/032* (2013.01); *C09D 1/00* (2013.01); *G10K 11/20* (2013.01)

(58) Field of Classification Search
CPC .......... C09D 11/52; C09D 5/032; C09D 1/00; G10K 11/20; E04B 1/82; E04B 1/99; E04F 13/072
USPC ............... 106/31.92, 464, 482; 181/175, 296
See application file for complete search history.

(56) References Cited

U.S. PATENT DOCUMENTS

| | | | | |
|---|---|---|---|---|
| 3,894,169 A * | 7/1975 | Miller | ........................ | E04B 1/82 181/207 |
| 3,929,692 A * | 12/1975 | Offerman | ............. | C09D 7/1291 106/698 |
| 4,010,134 A * | 3/1977 | Braunisch | ............. | G10K 11/165 252/62 |
| 6,872,761 B2 * | 3/2005 | LeStarge | .............. | G10K 11/165 427/195 |
| 7,033,963 B2 * | 4/2006 | Felegi, Jr. | .............. | C09D 5/028 181/286 |
| 8,210,310 B1 * | 7/2012 | Yeung | ........................ | E04B 1/82 181/284 |
| 8,512,814 B2 * | 8/2013 | Bilotto | ........................ | E04B 1/82 252/62 |
| 8,737,632 B2 * | 5/2014 | Denney, III | ............ | G10K 11/02 381/61 |
| 9,140,004 B2 * | 9/2015 | Hansen | ...................... | E04B 1/84 |
| 2010/0129643 A1 * | 5/2010 | Yeung | .................. | G10K 11/162 428/327 |
| 2011/0042163 A1 * | 2/2011 | Serre | ........................ | C04B 26/02 181/284 |

FOREIGN PATENT DOCUMENTS

| | | | |
|---|---|---|---|
| CH | 704046 A1 | * | 5/2012 |
| JP | 03/119236 A | * | 5/1991 |

OTHER PUBLICATIONS

English translation of JP 03/119236, May 1991; 6 pages.*
English translation of CH 704046, May 2012; 9 pages.*

* cited by examiner

*Primary Examiner* — Helene Klemanski
(74) *Attorney, Agent, or Firm* — Morland C. Fischer

(57) ABSTRACT

An acoustic paint to be applied to the walls of a room in which a source of audible sound is located to improve the acoustic characteristics of the room and correspondingly improve the clarity (e.g., the warmth, richness and detail) of the sound that is generated by the source and detected by the ear of a listener located within the room. The acoustic paint includes a paint foundation into which is mixed a powdered piezoelectric material or a powdered non-piezoelectric crystalline material having a resonant frequency so that the powdered material will react to the sound generated within the room and thereby control the room acoustics depending upon the type of material and the resonant frequency thereof. An optional catalyst, such as an electrically conductive powdered graphite or powdered graphene, is mixed into the paint foundation. The mixture is stirred and then applied to the walls of the room by means of a brush, a roller, or the like.

10 Claims, No Drawings

ACOUSTIC PAINT

BACKGROUND OF THE INVENTION

1. Field of the Invention

This invention relates to an acoustic paint that can be applied to the walls of a room to improve the audible clarity of sound generated within the room and heard by a listener. The acoustic paint includes a powdered piezoelectric or non-piezoelectric crystalline material having a resonant frequency which reacts to the sound to control the acoustics within the room.

2. Background Art

A listener may find himself located within a room while listening to music or other audio content. In many cases, the sound is emitted from a speaker and transmitted unidirectionally to the listener. That is to say, the listener may not know that he is surrounded by sound or that the sound is coming to him from different directions. Moreover, the sound can be absorbed or distorted by the walls of the room, such that the audible clarity of the sound is negatively impacted.

Therefore, it would be desirable to have an innocuous and aesthetically pleasing treatment to cover some or all of the walls of the room by which to control the acoustics in the room and improve the audible clarity (e.g., the warmth, richness and detail) of the sound heard by the listener whether or not speakers are used. In this same regard, it would also be desirable for the sound to appear to the listener to be more realistic (i.e., live) and coming to him from different directions within the room in which he is located.

SUMMARY OF THE INVENTION

In general terms, an acoustic paint is disclosed to be applied to some or all of the walls of a room to improve the acoustic characteristics of a room and the clarity (e.g., the warmth, richness and detail) of audible sound generated within the room and transmitted to the ear of a listener. The acoustic paint includes a conventional wall treatment paint to serve as a thick base or foundation. A finely powdered piezoelectric or non-piezoelectric crystalline material is mixed into the paint foundation. The powdered piezoelectric or non-piezoelectric material added to the paint foundation has a resonant frequency so as to be capable of reacting to the sound generated within the room in order to control the room acoustics depending upon the type of material and the resonant frequency thereof. To enhance the reaction of the piezoelectric or non-piezoelectric material to the sound, an optional electrically conductive catalyst can also be added to the paint foundation. By way of example, the catalyst may be either finely powdered graphite or graphene. The powdered piezoelectric or non-piezoelectric material and the powdered catalyst are uniformly mixed into the paint foundation, and the resulting acoustic paint mixture is then applied to the walls by a roller, brush or the like.

BRIEF DESCRIPTION OF THE DRAWINGS

There are no drawings in this application.

DESCRIPTION OF THE PREFERRED EMBODIMENT

A preferred embodiment for an acoustic paint to be applied to the walls of a room to improve the acoustic characteristics of the room is now disclosed. That is, some or all of the walls of a room in which a source of audible sound is located are covered with the acoustic paint in order to improve the clarity of the sound generated in the room and detected by the ear of a listener. By virtue of the foregoing, the sound will appear to be warmer, richer and more detailed to the listener than had the walls of the room in which the listener is located not have been treated with the acoustic paint of this invention. The sound will also appear to the listener to be realistic (i.e., live) and coming from different directions.

The acoustic paint includes a conventional oil-based or latex paint that is customarily applied to cover the walls of a room. The paint serves as a relatively thick foundation to which acoustic control particles are added. The paint may be either white or have a color to best suit the aesthetic requirements of the listener. Prior to the application of the acoustic paint to the walls, either a piezoelectric or a non-piezoelectric material is mixed into the paint foundation. One example, of a piezoelectric material to be mixed into the paint foundation is finely powdered quartz. In the case where a non-piezoelectric material is added to the paint, it is preferable that such material be a finely powdered crystalline material. Examples of non-piezoelectric crystalline materials that are suitable to be added to the paint foundation include calcite, tourmaline and carborundum.

The powdered piezoelectric or non-piezoelectric material that is added to the paint foundation must have a resonant frequency so as to be able to react to the sound generated within the room. To this end, the piezoelectric or non-piezoelectric material of the acoustic paint is adapted to control the room acoustics depending upon the type of material and the resonant frequency thereof.

To enhance the reaction of the piezoelectric or non-piezoelectric material of the acoustic paint to the sound within the room, an optional catalyst can also be added to the paint foundation. The catalyst preferably has an electrically conductive characteristic. By way of example only, the optional catalyst is a finely powdered graphite or graphene material.

By way of one particular example, the acoustic paint of this invention includes a mixture of the aforementioned paint foundation and the following constituents which are now described for each ounce of the paint foundation used to cover the walls of the room to be treated. Added to each ounce of the paint foundation is 2.5 grams of fine crystalline powder. As indicated above, the quality of the sound detected by the ear of the listener will be dependent upon the resonant frequency of the crystalline powder. The crystalline powder has an ideal particle size distribution of between 4.0 µm to 60 µm. The electrically conductive catalyst that is added to the paint foundation is 0.15 grams of fine nano-graphite powder having an ideal particle size distribution between 0.25 µm to 5.0 µm. The aforementioned components are stirred until they are uniformly mixed into the paint foundation. The resultant acoustic paint mixture is then applied to the walls of the room as a primer and/or a finished coat by means of a paint brush, a roller, or the like.

The acoustic paint mixture described above includes a thick paint base or foundation to bind the crystalline powder to the graphic powder. However, other foundations having an adhesive characteristic (e.g., a viscous glue) can be added to the paint foundation to help the combination crystalline powder and graphite powder adhere to each other and the walls of the room. It is also within the scope of this invention to coat wall paper with the acoustic paint and then cover the walls of the room with the acoustic paint treated wall paper.

The invention claimed is:

1. An acoustic paint to be applied to at least some of the walls of a room in which a source of audible sound is located in order to improve the acoustic characteristics of the room and thereby improve the clarity of the sound that is generated by the sound source and detected by a listener in the room, said acoustic paint comprising a paint foundation into which is mixed a finely powdered crystalline material having a particle size lying in a range between 4.0 μm to 60 μm and a resonant frequency so that the crystalline material will resonate in response to the sound generated by the source.

2. The acoustic paint recited in claim 1, wherein said powdered crystalline material is a piezoelectric material.

3. The acoustic paint recited in claim 2, wherein said piezoelectric material is quartz.

4. The acoustic paint recited in claim 1, wherein said powdered crystalline material is one of a group of crystalline materials consisting of calcite, tourmaline and carborundum.

5. The acoustic paint recited in claim 1, further comprising an electrically conductive powdered catalyst that is mixed with the crystalline material into the paint foundation so as to enhance the responsiveness of the reaction of the crystalline material to the sound generated by the source thereof.

6. The acoustic paint recited in claim 5, wherein the electrically conductive powdered catalyst is one of either graphite or graphene.

7. A method for treating at least one wall of a room in which a source of audible sound is located for improving the acoustic characteristics of the room and the clarity of the sound that is generated by the sound source and detected by a listener within the room, said method comprising the steps of:

making an acoustic paint mixture by combining with a paint foundation a finely powdered crystalline material having a particle size lying in a range between 4.0 μm to 60 μm and a resonant frequency so that the crystalline material will resonate in response to the sound generated by the source; and applying the acoustic paint mixture to the at least one wall of the room.

8. The method recited in claim 7, wherein the powdered crystalline material is a piezoelectric material.

9. The method recited in claim 7, comprising the additional step of adding an electrically conductive powdered catalyst to the mixture of said powdered crystalline material and said paint foundation prior to the step of applying said acoustic paint mixture to the at least one wall of the room.

10. The method recited in claim 9, comprising the additional step of selecting said electrically conductive powdered catalyst from one of either graphite or graphene.

* * * * *